United States Patent [19]

Tournois

[11] 4,403,314

[45] Sep. 6, 1983

[54] ACTIVE DETECTION SYSTEM USING SIMULTANEOUS MULTIPLE TRANSMISSIONS

[75] Inventor: Pierre Tournois, Paris, France

[73] Assignee: Thomson-CSF, Paris, France

[21] Appl. No.: 244,714

[22] Filed: Mar. 17, 1981

[30] Foreign Application Priority Data

Mar. 18, 1980 [FR] France .................................. 80 06043

[51] Int. Cl.³ .............................................. G01S 15/42
[52] U.S. Cl. ................................ 367/100; 343/55 A; 343/5 FT; 367/11; 367/101
[58] Field of Search .......................... 367/11, 100, 101; 343/5 FT, 5 SA, 16 R, 17.2 R, 17.2 PC, 5 NQ

[56] References Cited

U.S. PATENT DOCUMENTS

| 3,680,100 | 7/1972 | Woerrlein | 343/16 R |
| 3,680,105 | 7/1972 | Goldstone | 343/5 FT |
| 3,771,116 | 11/1973 | Farrah | 367/11 X |
| 3,956,749 | 5/1976 | Magorian | 343/16 R |
| 4,119,940 | 10/1978 | Keating et al. | 367/11 X |
| 4,222,050 | 9/1980 | Kiuchi et al. | 343/5 FT X |
| 4,288,866 | 9/1981 | Sackman | 367/11 |

*Primary Examiner*—Richard A. Farley
*Attorney, Agent, or Firm*—Oblon, Fisher, Spivak, McClelland, & Maier

[57] ABSTRACT

A system for detection by an echo containing transmission and reception sources for detection by acoustic waves in particular. A circular base with N columns $T_1$, $T_2$, $-T_i,-T_N$ of electroacoustic transducers. To each column such as $T_i$ corresponds a transmission at the frequency $f_i$. A switch makes it possible to change from transmission to reception. The signals received are applied to a channel forming device. For each channel such as $V_k$ the signals are filtered at frequencies $f_1$, $f_2$, $-f_N$, which are applied to time offset circuits taking into account the base geometry and the channel direction. The signals obtained such as $d_{i,k}$ are applied to a display device which supplies the range, direction and speed of the targets detected. This is particularly applicable to underwater surveillance by sonar or radar.

6 Claims, 7 Drawing Figures

ACTIVE DETECTION SYSTEM USING SIMULTANEOUS MULTIPLE TRANSMISSIONS

BACKGROUND OF THE INVENTION

The purpose of the present invention is an increase in the resolution of active detection systems whose transmissions may be either electromagnetic, such as radars, or acoustic, such as sonars.

In these systems which are intended either for target direction or for extraction and identification or classification of certain parameters of possible targets or for image forming, the mode used, for sonar in particular, to illuminate the angular field to be observed is that of a single, coherent transmission, which covers the whole angular field to be observed, of duration T and bandwidth b emitted round a carrier frequency $f_0$, while for reception, a set of angular channels is formed in parallel to cover this field.

The angular resolution of these systems is virtually that of the reception antenna and it is known that its dimensions add a limiting factor to this resolution.

It is known to increase the spatial resolution of systems in the sonar field with a linear acoustic base which uses, for transmission, a so-called interferometric mode that consists in transmitting two signals at the same frequency simultaneously from two transducers at the ends of the base.

The result of this transmission is the formation in space of zones that are sounded and unsounded alternately and, when convoluted with preformed channels on reception, give directivity improved by a coefficient of 2, the existence of the unsounded zones being the disadvantage of the method.

This can be corrected by two separate methods. Either a second simultaneous transmission is used, which is offset angularly with respect to the preceding one and which doubles the sweep time or two simultaneous transmissions are used, which are separate in frequency, one having the characteristics of the first transmission above and the other those of the other transmission, but then the useful band is doubled.

Another example of improvement in the directivity can be found in U.S. Pat. No. 4,119,940—Keating, which also uses N frequencies for transmission. This invention, which separates well the signals produced at the different frequencies but causes them later to lose their identity related to their different frequencies and does not do any space-time processing on them, is applicable neither for base-object relative movements nor for non-planar base.

SUMMARY OF THE INVENTION

The system in accordance with the invention corrects these disadvantages. For the angular resolution, the system proposed is identical to a system which forms channels both on transmission and reception, i.e. it gives an angular resolution double that of a system which only forms them on reception.

For resolution in range and "Doppler speed," the system proposed is identical to a classical active system which transmits a signal of length T and band B on each recurrence, i.e one range resolution of c/B and one Doppler frequency resolution of 1/T in which c is the wave speed.

For the data rate, the system proposed is identical to one transmitting a single signal of duration T and band B on each recurrence and forming narrow channels on reception only.

Also, the system has the advantage that it can be applied to certain equipments already existing.

These equipments are those whose transmission source are fed by modular transmitters and whose channel formations are wide band. The invention can be applied to them by coding the pilot signals of the transmitters at low level and adding, after the formation of the reception channels already existing, signal decoding in these channels followed by temporal offsetting of the signals decoded.

In short, it is a system for transmission and target detection by echo reception which contains:

sources $E_1, \ldots, E_M$ forming a transmission array of depth d, which transmits simultaneously waves modulated by signals coded $C_1, \ldots, C_M$, the codes being different and separable, reception sources $H_1, \ldots, H_N$, forming a reception array which receives signals in an overall band W, means for processing the signals received, means for using the signals processed, wherein the processing means contain, operating together:

means for forming channels, called reception channels, in the direction $\theta_1, \ldots, \theta_{2N}$ with directional functions $D_1, \ldots D_{2N}$, means for decoding the signals received adapted to codes $C_1, \ldots C_M$ in each of the so-called reception channels, means for forming, on reception, channels, called transmission channels, with directions and directional functions roughly identical to the corresponding reception channels.

Other characteristics and advantages will appear from the description which follows.

DESCRIPTION OF THE PREFERRED EMBODIMENT

Assume a set of sources $S_1, \ldots S_P$ of which M are able to have the transmission functions $E_i$, ($1 \leq i \leq M$) and N the reception functions $F_s$, ($1 \leq j \leq N$). The position of these sources are such that channels can be formed both on transmission and reception.

The distribution of these sources may be random provided that their coordinates are known. However, the most commonly used are tri-rectangular, spherical, cylindrical, circular, conforming, etc. distributions. The distribution of the energy in space or directivity D, which results from the channel formation on transmission and reception is generally expressed by means of two angular parameters D ($\theta$, $\phi$), $\theta$ in a horizontal and $\phi$ in a vertical plane.

When these conditions have been stated, the purpose of the invention is an improvement in the spatial resolution of the system by superimposing the directional function on transmission $D_E(\theta, \phi)$ and the directional function on reception $D_H(\theta, \phi)$ along roughly the same direction $(\theta_m, \phi_n)$ with the condition that $D_E(\theta, \phi) = D_H(\theta, \phi)$ no matter what the values of $\theta$ and $\phi$, the result being an overall directivity $D(\theta, \phi)^2$ improved by a factor of 2.

It is known that the directivity may be improved by superimposing the channels formed on transmission and reception. However, the processing of the signals in accordance with the invention enables the disadvantages of known practice to be avoided. The system proposed is based on the combination of the transmission and reception functions.

Figure 5:
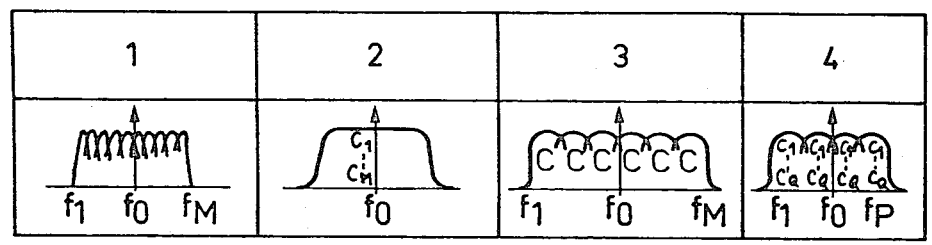
FIG. 5, a representation of codes used for transmission.

In the system in accordance with the invention, M signals, coded $C_1, \ldots, C_i, \ldots C_M$, which are separable in band b of the same duration T, are transmitted simultaneously by means of M sources, $E_1, \ldots E_i, \ldots E_M$, whose space coordinates are known. The main types of transmission possible are, for example (FIG. 5):

1—M signals of pure frequency $f_1, \ldots f_i, \ldots f_M$ of duration T separated in frequency by $1/T = b$, 2—M signals of the same center frequency $f_o$ coded in the same band b with M orthogonal codes of duration T in which $bT > M$, 3—M signals coded in the same band b with the same code of duration T in which $bT > 1$ and with different center frequencies separated in frequency by the distance b, 4—M signals coded in the same band b with Q orthogonal codes ($Q < M$) of duration T in which $bT > Q$ and P different centre frequencies ($PQ = M$) separated in frequency by the distance b.

As far as reception is concerned, this consists in receiving at N transducers $H_1, \ldots H_N$, the echoes from these transmissions, each transducer receiving all the echoes during the recurrence which come from the waves transmitted by all the transmitters, $E_1$ to $E_M$, these signals being processed in three stages:

(1) Formation in real time, i.e., in parallel, of all the reception channels $V_k$ with directions $(\theta_m, \phi_n)$ from these transducers $H_1, \ldots H_N$, these channels having a certain directivity $D_H(\theta, \phi)$.

(2) sorting by matched filtering in each direction $(\theta_m, \phi_n)$ thus obtained, of echoes coming from the various transmissions $E_1$ to $E_M$, (3) formation of directional transmission channels with a directivity $D_E(\theta, \phi)$ roughly identical to that of the reception channels and in the same directions by temporal offset which consists in superimposing, in each of these directions $(\theta_m, \phi_n)$, all the echoes thus sorted by suitable delay or phase means and summing them in amplitude and phase for each possible range slot.

Figure 1:
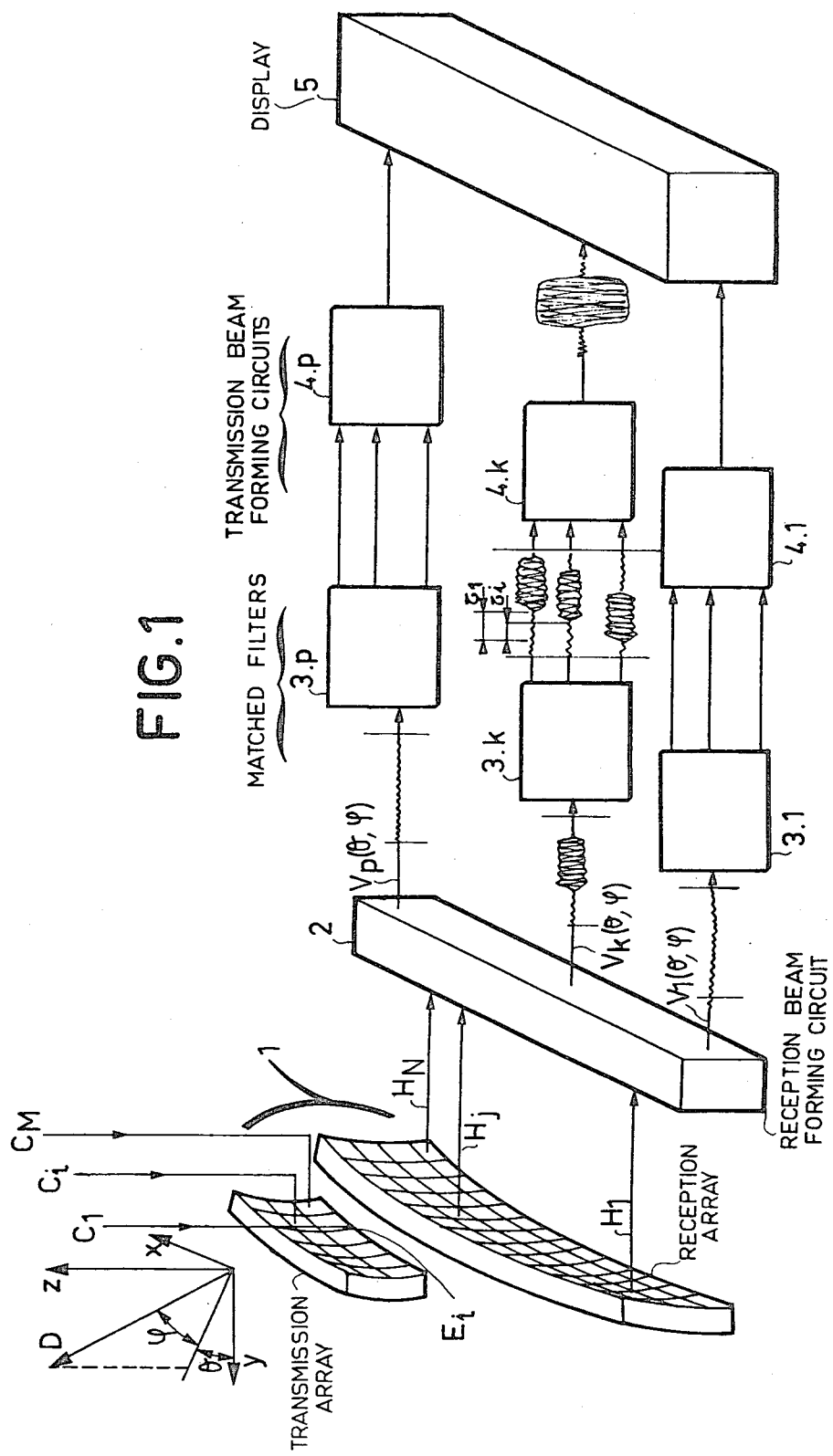
FIG. 1, the detection system with simultaneous transmission in accordance with the invention.

FIG. 1 shows these various stages.

1 represents an array, which may be conforming, i.e has the shape of its carrier (the stem of a ship for a sonar), consisting of M transmission sources $E_1$ to $E_M$, which receive from M generators (not shown) their electric signals coded $C_1$ the $C_M$ in accordance with one of the codings mentioned above and N reception sources $H_1$ to $H_N$.

In circuits 2 the first signal processing operation takes place which consists in forming in parallel (or in series if the time taken to do it is less than the reciprocal of the overall band) all the reception beam channels in the directions $(\theta_m, \phi_n)$ required for the system. This formation of channels in the band $W = B$ (transmission) $+ D$ (in which D is the maximum variation in frequency due to the Doppler effect) can be obtained either by means of devices giving suitable delays in the case in which the depth of the array, i.e the distance covered by the waves to reach all the array transducers in the direction $(\theta, \phi)$, which is the most inclined of the channels formed, is greater than $c/W$, or by means of devices giving suitable phase shifts in the case in which this depth is less than $c/W$ for each of the signals coming from the transducers $H_1, \ldots H_N$, this operation being carried out a different number of times p corresponding to p separate directions $(\theta_m, \phi_n)$.

At the output of circuit 2 there are then p channels formed, $V_1, \ldots V_k, \ldots V_p$, each containing all the echoes coming from all the transmitters $E_1$ to $E_M$.

The signals from each of these channels, such as $V_k$, are applied to a circuit such as 3.k in which is carried out the second operation of signal processing which consists in sorting the echoes, in each direction of reception $(\theta_m, \phi_n)$ previously obtained, in accordance with the points in the transmission space which are at the origin of their production. This is made possible by the coding of the transmission which identify the transmitters $E_1, \ldots E_M$. This sorting is done by means of filters matched to the transmission codes, the Doppler effect of the targets being taken into account. A simple example of matched filter can be given in the principle of coding 1 given above (pure frequencies of length T separated in frequency by $1/T$). The sorting operation after each of the reception channels $V_k(\theta, \phi)$ then consists in a spectrum analysis of resolution $1/T$ in an overall band $W = M \times (1/T) + D$, in which D takes into account all the possible relative movements of the objects to be observed. This sorting of signals at different frequencies can be obtained.

either analogically by the use of $M + DT = R$ simple band pass filters in parallel separated in frequency by $1/T$ (simultaneous data) or by the use of Fourier transforms with dispersive delay lines. This type of processing is described in "Use of dispersive delay line for signal processing in underwater acoustics" by P. Tournois and J. Bertheas, JASA 1969, pp. 517–531, or digitally by processing such as a fast Fourier transform (F.F.T.) with a resolution of $1/T$.

There are R different outputs, as many as there are channels analyzed in the whole band (FIG. 1 only shows M, i.e the case without Doppler), at the output of circuits 3.1, 3.2, ... 3.p and for each reception channel.

Another example of an matched filter can also be given in the second coding in which all the signals are transmitted at the same central frequency but with separable codes $C_1, \ldots C_i, \ldots C_M$ called orthogonal codes. The role of this filter consists in comparing the different codes received with the code $C_i$ it has in its memory. The comparison supplies a signal, called a correlation signal, which is a maximum when the signal received contains the code $C_i$ among all the others and a minimum when it does not.

This matched filter is a correlator. (This processing is described in "Digital communications" by S. W. Colomb (Prentice Hall) with examples of orthogonal codes).

In this second example, the sorting of the signals received will be carried out after each of the reception channels by R correlators, as many as there are different codes in the overall band $W = b + D$ of signals received.

The third coding corresponds to a double coding: to M frequencies and inside each of these frequencies.

The matched filter is obtained by spectrum analysis followed by a single filter matched to the specific code.

If this code is, for example, that of a transmission modulated linearly in frequency, the correlator will be a filter with a matched delay law (this processing is described in the article already mentioned "Use of Dispersive Delay Line").

The fourth coding is a mixture of the preceding codings. Its interest lies in the reduction of the band required by the third coding type for example. For example, this band can be divided by two by placing two orthogonal codes at each of the frequencies $f_1$ to $f_{M/2}$, which are modulated linearly in frequency one with increasing frequencies and the other with decreasing ones.

The third reception signal processing operation is carried out by circuits $4.1, \ldots 4.k, \ldots 4.p$ and consists in the algebraic reconstruction of the transmission channels. This algebraic reconstruction is obtained, as for the forming of the reception channels discussed above, by the introduction of delays $\tau_1$ or different phases $U_i = \omega_0\tau$ not into the signals coming from reception sources $H_1, \ldots H_N$ but into the signals previously sorted and corresponding roughly to the Doppler effect, from sources $E_1, \ldots E_M$ and this for each direction $(\theta_m, \phi_n)$ of the reception channels.

The processing in circuits $4.1, \ldots 4.p$ corresponds physically to two effects:

a effect of "directivity on transmission" since the offset is only valid for a given direction, a temporal effect of "pulse compression" whose explanation can be given more easily if the signals transmitted for the first coding are considered. The envelope of the superimposition or "offset" and the algebraic sum of N signals of separate pure frequencies, distant $1/T$ from one another in a band $B = N/T$ is absolutely identical to a short signal of Sin BT/BT of length $1/B$, i.e N times shorter than the original signal.

An object, which is receding or approaching with a radial speed V shifts in phase the transmission frequency $f_i$ by the quantity $(2V/C) \times f_i = D$ as a first approximation if $V << c$.

More generally, this frequency shift will result in a disturbance to the codes received which may lead to a zero result for convolution with the matched filters.

In the case of the first coding, the frequency shift causes an apparent angular rotation of the transmission sources and the direction of the transmission beams formed may no longer correspond to the direction of the reception beams formed. This is the problem of sensitivity to the Doppler effect.

The solution consists in using a transmission code type, a transmission-reception source geometry and a frequency distribution which are less sensitive to the Doppler effect and in using a larger number of matched filters, in the limit one per Doppler resolution step.

Figure 2:
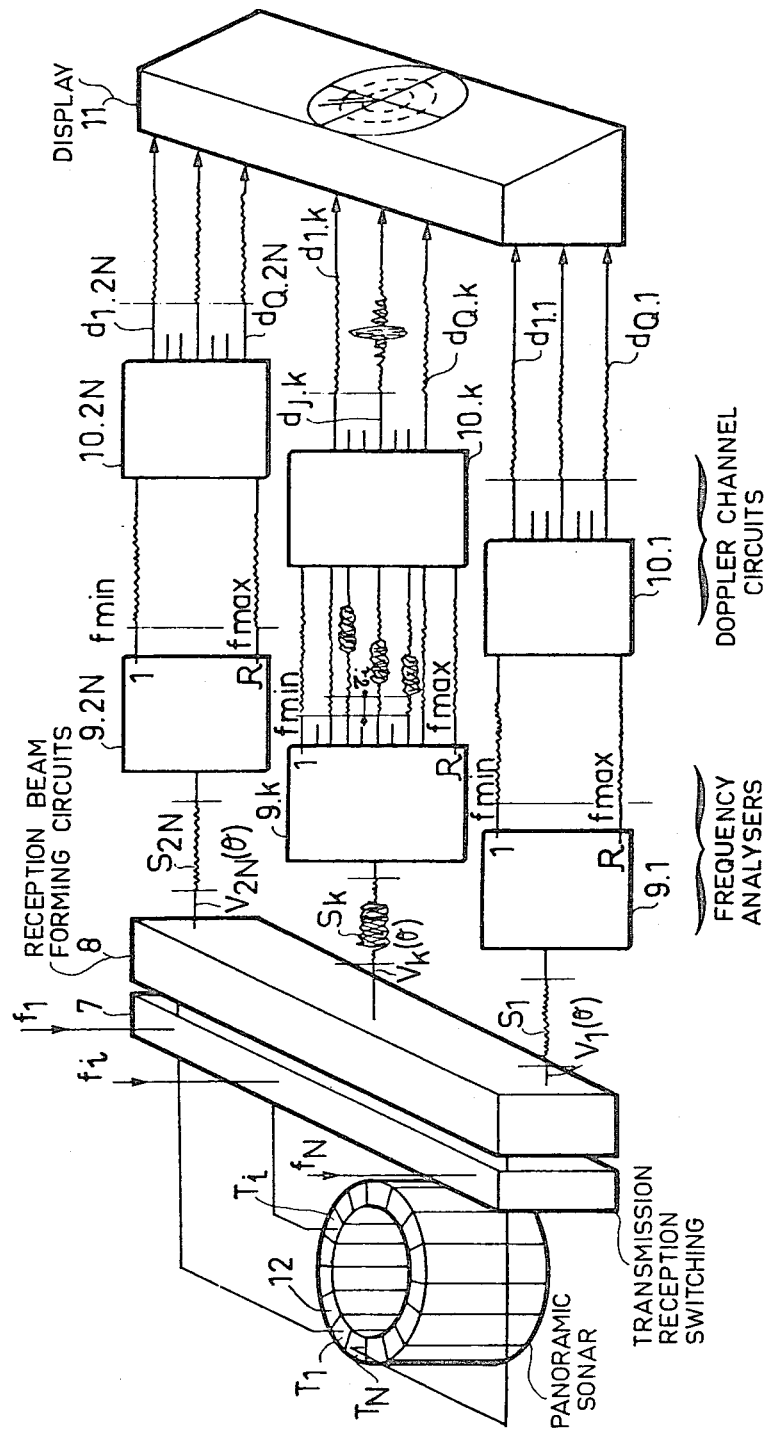
FIG. 2, the general block diagram for a sonar with a circular base.

FIG. 2 shows the block diagram of a particular production of the invention applied to a so-called panoramic sonar, because it is able to cover the whole horizon, in which it is desired to increase the directivity of the channels formed by a factor of 2 with respect to prior practice.

A circular base 12 contains N columns of transducers such as $T_i$ which are connected to transmission-reception switching circuits 7. The signals received are applied to beam forming circuits 8. There are the elements of FIG. 1 matched to the first coding case. Each of the channels formed in circuit 8 is analyzed in frequency by circuits $9.1, \ldots 9.k, \ldots 9.2N$ and the frequency samples are then offset in time and superimposed in transmission channel forming circuits $10.1, \ldots 10.2N$ which supply the successive Doppler samples for a given (transmission + reception) channel displayed by the operating system 11.

The shape of the signals obtained at the output of circuits $8, 9.1, \ldots 9.2N, \ldots 10.1, \ldots 10.2N$ is shown in FIG. 2.

At the output of channel forming circuit 8, $S_1, \ldots S_k, \ldots S_{2N}$, the signals of the channels formed $V_1(\theta), \ldots V_k(\theta), \ldots V_{2N}(\theta)$ are obtained. It is assumed that the target was in the direction corresponding to channel $V_k(\theta)$ and that the other signals only represented noise.

At the output of spectrum analysis circuit $9.k$ there are R frequency analysis channels only M of which contain a useful signal, the others $R-M$ also represent noise. The M useful signals are offset in time in accordance with the geometry of the base 12 by times such as $\tau_1$.

At the output of transmission channel forming circuit 10.k, the preceding M useful signals are offset in time to compensate for delays such as $\tau_i$ in the direction of channel $V_k(\theta)$.

Because of the nature of coding in frequency, the duration of the signals obtained in one of the Doppler channels $d_{j,k}$ at the output of circuit 10.k is compressed in the ratio BT and its amplitude is increased by a factor of $(BT)^{0.5}$ $d_{j,k}$ corresponds to the speed of the target detected in channel $V_k(\theta)$.

Figure 3:
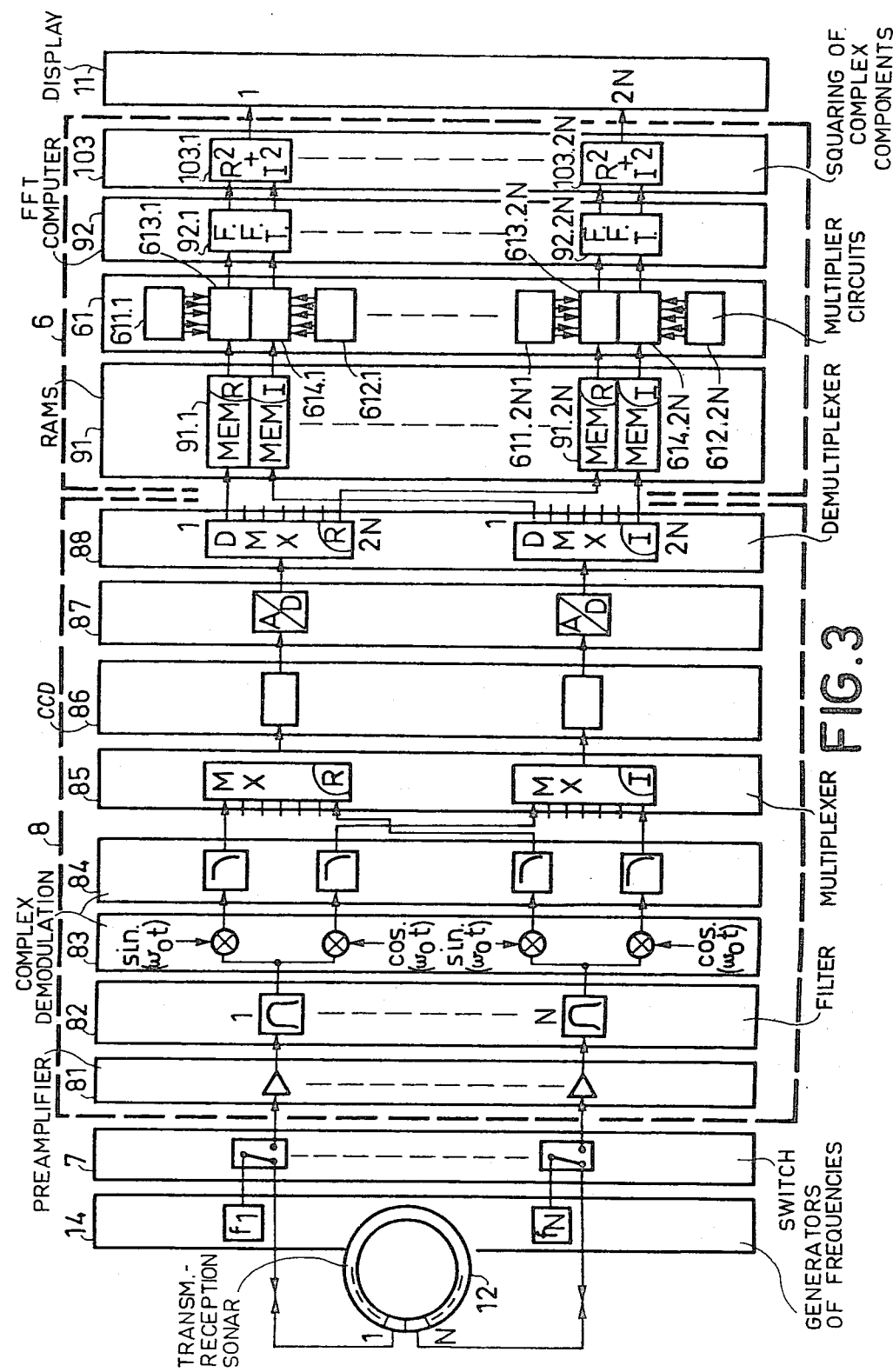
FIG. 3, the processing diagram for a sonar with a circular base.

FIG. 3 shows the detailed block diagram of the preferred embodiment for the assembly in FIG. 2. The cylindrical acoustic base 12 consists of N identical columns. The columns transmit (functions $E_1, \ldots E_i, \ldots E_N$) and receive (functions $H_1, \ldots H_i, \ldots H_N$) alternately.

All the transmissions are simultaneous, of duration T and band $b = 1/T$, the pure frequencies $f_1, \ldots f_i, \ldots f_N$ generated by generators 14 being applied respectively to the columns. This is then the transmission mode for the first coding.

Switches 7 pass the transmission signals to the respective columns and the reception signals $H_1, \ldots H_i, \ldots H_N$ to the reception channels, one per column, formed by circuits 81, 82, 83 and 84. Circuit 81 represents a preamplifier and level regulator. Circuit 82 is a band pass filter of width $B+D$. Circuit 83 represents a frequency changer intended to being the centre frequency $f_o = (f_1 + f_2)/2$ to around zero frequency, i.e transfer the reception spectrum to the so-called "base" band where the real and imaginary parts of the signal are transmitted separately. These two components, out of phase by $\pi/2$, are necessary to keep both the amplitude and phase data of the signals received. This operation, which is not required when the reception channels have been formed in circuit 86, is carried out to obtain the complex product.

A low pass filter 84 filters the intermodulation products obtained beyond the band $(B+D)/2$. Sampler-multiplexer circuit 85 operates at the clock frequency $F_E = 1.25 (B+D)$, which is higher than the frequency determined by Shannon's theorem. At the output of 85 the samples of the signals moved from the successive columns are fed to the charge coupled device (C.C.D.) forming reception channels by interpolation.

Interpolation also enables 2N channels to be formed, i.e twice as many as the number of columns. Because of the increase in angular resolution provided by the present invention, the number of channels N of prior art is here doubled, i.e it rises to 2N.

At the output of devices 86 the successive analog samples of the channels formed corresponding to the directions $\theta_1, \ldots \theta_k, \ldots \theta_{2N}$ on successive turns exploring the horizon are to be found.

Figure 4:
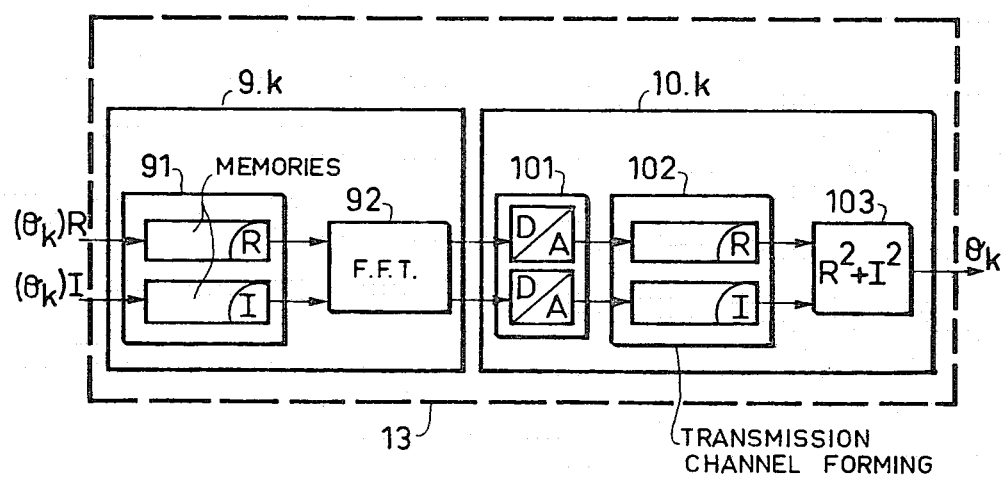
FIG. 4, details of circuits in FIG. 3.

Circuit 87 is an analog-digital converter in which the preceding analog samples are converted to digital samples in 8 bits. Circuit 88, a demultiplexer, is there to replace in parallel the signals from the 2N channels which were previously formed in series. Assembly 91 is a digital memory of the random access (RAM) type consisting of 2N memories such as 91.k, where $1 < k < 2N$, intended to retain a duration $T' = T + (d/c)$ for the successive samples in the same channel $\theta_k$, d/c in which d is the array depth already defined. Each memory 91.k is double, $(91.k)_R$ and $(91.k)_I$ which are filled simultaneously by demultiplexers 88. The number of memory elements in each of them is $F_E.T'$. This duration T', the length of the signal recorded, enables a fast Fourier transform (F.F.T.) to be produced in computer 92 with a frequency resolution of 1/T. The reason for the presence of multiplier circuit 61 will be better understood by reference to FIG. 4 which gives details of the blocks such as 9.k and 10.k, which form assembly 13 in FIG. 2, in which the operations of frequency analysis and time offset respectively of the transmissions are carried out. Circuit 91 is the memory already mentioned. The fast Fourier transform device 92 calculates the successive samples of the spectrum of the frequencies contained in the section T of the signal received by the reception channel $V_k(\theta)$. These successive frequencies are converted to analog signals in analog-digital converter 101 and passed to circuit 102 forming transmission channels by temporal offset of the frequency signals.

This transmission channel forming can be done, for example, by a charge coupled device since the offset depends on the array geometry as for the reception channel forming. As has been seen in this production, which operates in a narrow band, the forming of channels was really a simple phase offset. Hence, this forming of transmission channels in the frequency field is a simple frequency convolution between the spectrum $g_k(\omega)$ received from the direction $\theta_k$ and the spectrum $h_k(\omega)$, a complex conjugate of the spectrum and all the signals emitted at infinity in the medium and in the same direction. The known relationship (Plancherel's theorem) makes it possible to pass from a convolution in the frequency space to a simple product in the time space. If then $G_k(t)$ and $H_k(t)$ are the Fourier transforms of the respective functions $g_k(\omega)$ and $h_k(\omega)$, then the Fourier transform of $(G_k(t) \cdot H_k(t))$ is $g_k(\omega) h_k^*(\omega)$; a relation which shows that the convolution operation carried out in circuit 102 after the Fourier transform carried out by computer 92, can be replaced by a simple time multiplication, carried out term by term before the Fourier transform.

Circuit 61 in FIG. 3 consists then of two digital memories for each channel $V_k(\theta)$, of the programmable read only memory type PROM 611.k and 612.k and multiplier circuits 613.k and 614.k. Memories 611.k and 612.k contain respectively the real and imaginary parts of the impulse response in the matched filter to the various codes superimposed and transmitted in the direction $\theta_k$. This recorded temporal signal is merely the physical signal $S(\theta_k, t)$ returned in time, received at a point distant from acoustic base 12 in the direction $\theta_k$ and converted to the base band. Hence, it only depends on:

the code transmitted by each of the columns, the geometry of the columns with respect to direction $\theta_k$, a geometry which introduced the various phase shifts in this direction, possibly, a window for weighting the function recorded.

The number of cells in memories 611.k and 612.k is the same as that in memories 91. The $T.F_E$ samples in memories 91 are brought out and multiplied term by term by the $T.F_E$ samples in memories 611.k and 612.k in multipliers 613.k and 614.k of the real and imaginary parts.

In computers 92.k are the operators for the fast Fourier transform which operate on $T.F_E$ points at the analysis recurrence of T/N.

As many F.F.T. computers are shown in FIG. 3 as there are reception channels. However, the computing speed of these operators enables the computing work of several reception channels, four for example, to be assigned in sequence to a single operator.

The samples obtained at the output of computers 92 represent the real and imaginary pats of the frequency analysis of the signals in a given channel after its double formation. They are therefore the Doppler channels in series obtained at the frequency step of 1/T. There are D.T of them.

In computing circuit 103 the square of the modules in the real and imaginary parts, R and I, of these Doppler frequency samples is calculated.

The device using this data in a display receives the 2N reception/transmission channels with the data in each channel concerning target range and speed.

The display uses a colour tube with the image ($\theta$, range) in mode B. The Doppler data are applied to the chrominance signal.

In a preferred production there are the following characteristics:

| | |
|---|---|
| Acoustic base diameter | $\theta = 2.5$ m |
| Number of columns | N = 32 |
| Transmission length | T = 0.3 sec |
| Frequencies | $f_i = 3500-53$ Hz |
| Transmission band | $B = \frac{N}{T}$ 106 Hz |
| Doppler band for v = 30m/sec | D = +140 Hz i.e. 280 Hz |
| Overall band | W = B + D = 386 Hz |
| Sampling frequency per column | $F_E = 426$ Hz |
| Distance covered by the wave between two samplings | $\frac{c}{F_E} = 3.50$ m (compare with $\theta$) |
| Number of memory cells (91 · k) | $T \cdot F_E = 828$ elements |
| F.F.T. analysis recurrence time | $\frac{T}{N} = 9.4$ msec |
| Total number of F.F.T. calculations per second | $\frac{2 \cdot N^2}{T} = 6827$ F.F.T./sec |
| Number of elementary operations in an F.F.T. | $\frac{T \cdot F_E}{2} = \log_2(T \cdot F_E) = 448$ |
| Total number of elementary operations in an F.F.T. | $6827 \times 448 = 3,058,496$/sec |
| Number of F.F.T. computer circuits 92 with a 1.3 μsec cycle | 4 |
| Number of Doppler channels | DT = 84 |

In a variant of the invention the two operations carried out in circuits such as 3.k and 4.k respectively for matched filtering for the transmissions matched and transmission channel forming can be replaced by a single operation carried out by a device for convoluting the signal received in each channel with the copy of the sum of the signals emitted at infinity in the direction corresponding to this channel and inverted in time.

Figure 6:
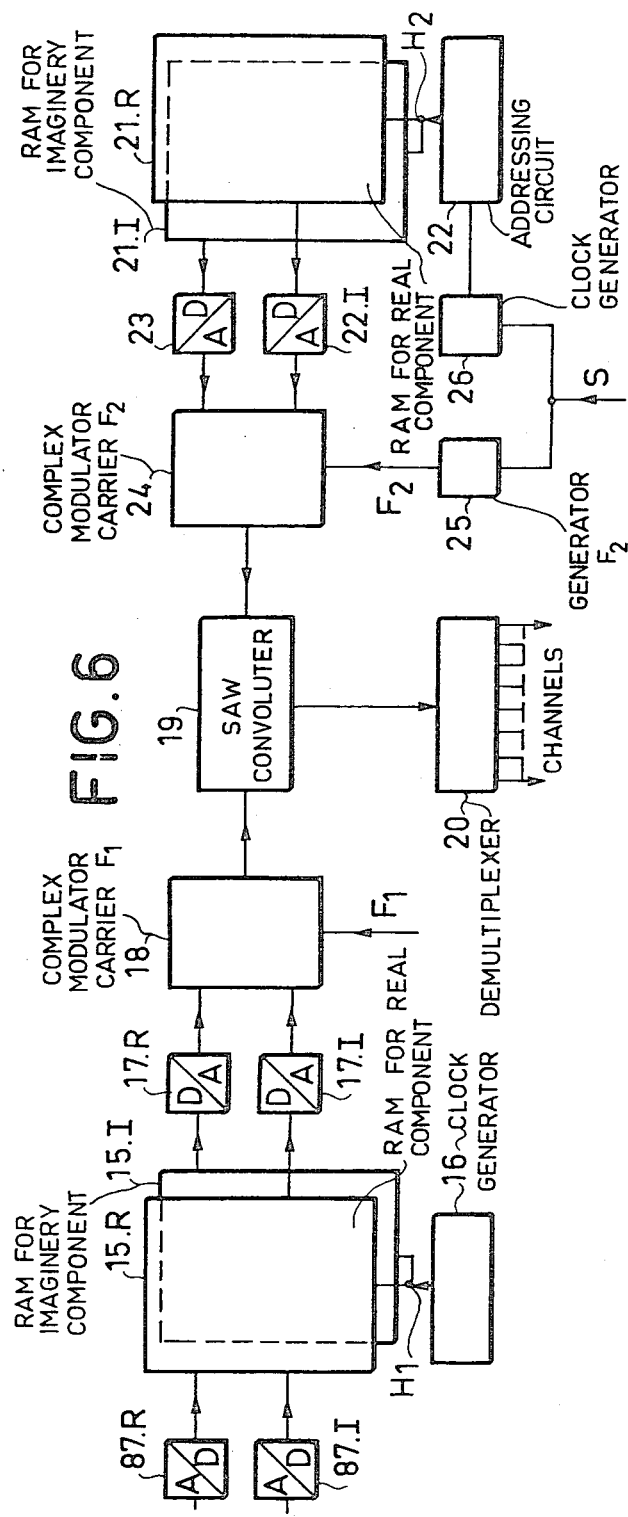
FIG. 6, the schematic diagram for a variant of the invention.

FIG. 6 shows the general block diagram of this variant of the invention which replaces all the processing carried out by circuits 9.1, ... 9.2N and 10.1, ... 10.2N.

Memories 15.R and 15.I are addressable memories of the RAM type in which the real and imaginary signals received in the channels formed are written in columns and read in lines, one line corresponding to one channel. Addressing of the signals on reading and writing is done by circuit 16. Writing is done at the same frequency as the sample output frequency of the channel forming circuit 86.

The duration of the signal recorded in each line is $T'=T+d/c$. Reading of these lines is carried out at a higher frequency $H_1$ so that the signal of length $T'$ and band $1/T$, now occupies a band $K/T'$.

The signals of the lines corresponding to the channels formed undergo a digital/analog conversion in circuits 17.R and 17.I and are then added to a carrier $F_1$ by complex modulator 18 which receives the components $\sin(2\pi F_1 \cdot t)$ and $\cos(2\pi F_1 \cdot t)$. The signal $V_1(t)$ coming from this modulator is passed to a convolution analog device 19 which is preferably an elastic wave device as described in the Proceedings of the International Seminar on Component Performance and System Application of SAW Devices, E.C.S Paige, pp. 167–180, 1973 (an I.E.E. publication) or in the I.E.E.E. Proceedings, P. Defranould and C. Maerfeld, p. 748, May 1976.

The centre frequency of this convoluter is $F_i$ and its band $K/F'$.

This convoluter also receives the convolution copy $V_2(t)$ defined above and corresponding to the same direction. It supplies a signal $C(t)$ which is demultiplexed by circuit 20 at whose output the various channels formed in parallel are obtained, each of the channels containing in series the three samples in each Doppler channel. These signals are used by display device 11 in FIG. 3.

Signal $V_2(t)$ is obtained from memories 21.R and 21.I which contain, in digital form, the copies, converted to the base band, of the signals emitted at infinity and inverted in time. These signals are stored in line, each line corresponding to a given direction.

This memory is of the programmable, read only memory type (PROM).

These data are read in lines, each line being read R times, R being the number of Doppler channels. Addressing is done by circuit 22 at the rate of $H_2$.

The data read in the two memories 21.R and 21.I are converted into analog signals by circuits 22.R and 22.I and added to a carrier at frequency $F_2$ by circuit 23, which is identical to circuit 18.

Figure 7:
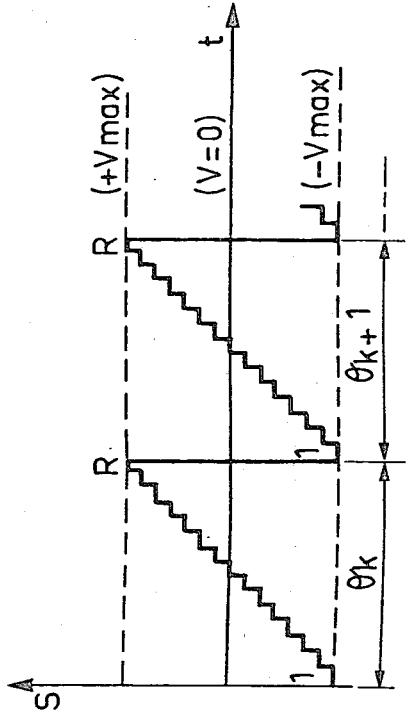
FIG. 7, the appearance of the signals for the variant in FIG. 6.

Carrier frequency $F_2$ and clock frequency $H_2$ are generated by generators 24 and 25 respectively which are of the voltage-controlled oscillator (V.C.O.) type, the shape of this voltage being shown in FIG. 7.

The whole device shown in FIG. 6 operates as follows. To each line read in memories 15.R and 15.I and fed to convoluter 19 with carrier frequency $F_1$ at the rate $H_1$, both of which are fixed, corresponds the homologous line in memories 21.R and 21.I fed to convoluter 19 with carrier frequency $F_2$ at the rate $H_2$, both of which are variable, this frequency and rate being changed R times. In each memory the homologous lines are then read R times, the first with fixed frequency and rate and the second with variable frequency and rate.

The amplitude of the variation in this frequency and rate around $F_2$ and $H_2$ are respectively: $\Delta F_2 = K \cdot f_o \cdot (4 V_{max}/c)$ and $\Delta H_2 = H_1 \times (4 V_{max}/c)$. This variation is obtained by R equal jumps and $V_{max}$ is the maximum speed of the target. For preference $Kf_o = F_1$.

The variation $\Delta F_2$ and $\Delta H_2$ during successive readings of the same line give copies of the transmission signals modified by a Doppler effect. This gives a signal in the Doppler channel corresponding to the target speed.

Detection systems have thus been described which, with an array of given dimensions, enable an improvement in the angular resolution to be obtained.

Evidently, this description has only been given as an indication for Sonar. The present invention is applicable to a Radar whose rotating antenna has been replaced by fixed sources distributed on a wave. In this case, the system enables an improvement to be obtained, not in the angular resolution but in the data rate as a function of the number of channels formed.

What is claimed is:

1. A system for detection of an echo comprising:
   a transmission array formed by M simultaneously transmitting sources $E_1, \ldots E_m$;
   a reception array formed by N sources, $H_1, \ldots H_N$;
   first signal processing means for receiving the output of said reception array sources for forming P reception channels having signals $V_1(\theta, \Phi), \ldots V_P(\theta, \Phi)$, where $\theta, \Phi$ are spherical angles defining the receiving direction, wherein said M transmitting sources $E_1, \ldots E_m$ transmit simultaneously wave signals with a duration T, said transmitted signals being different and separable;
   a second signal processing means receiving said P reception channel signals and outputting for each channel M at least one of decoded and filtered delayed signals, corresponding to said N transmitted signals, the delays of said signals corresponding to the geometry of said transmission sources and to the angles $\theta, \Phi$ of the channel direction;
   adder means for adding said delayed signals; and
   display means for receiving the output of said adder means.

2. A system for detection as claimed in claim 1, wherein said M simultaneous transmitting sources $E_1 \ldots E_M$ transmit respectively waves of pure frequency $f_1, \ldots f_M$, with duration T and band b such that $bT = 1$, separated in frequency by $1/T$, and wherein said second processing means includes decoding means carrying out spectral analysis.

3. A system for detection as claimed in claim 1, wherein said M simultaneously transmitting waves have respectively central frequencies $f_1, \ldots f_M$, wherein said waves being modulated by a same code of duration T and band b such that $bT \geq 1$ and wherein the interval between said frequencies is b and wherein said second processing means includes decoding means carrying out a spectral analysis followed by a convolution with a copy of said same code.

4. A system for detection as claimed in claim 1, wherein said transmission signals are formed by M simultaneous signals with P frequencies $f_1, \ldots f_p (P < M)$, each frequency being modulated by Q separable codes (PQ=M), the same Q codes being used at each of the frequencies of duration T and band b such that $bT \geq Q$, and wherein said second signal processing means includes decoding means carrying out a spectral analysis followed by a convolution with the Q copies of the codes transmitted.

5. A system for detection as claimed in claim 1, wherein said second processing means includes means for temporal offset followed by a means for decoding the signals received.

6. A system for detection as claimed in claim 1, wherein said second processing means includes a demodulator means whereby the signal supplied by the reception channels are subjected to complex demodulation with the real and imaginary components being stored in a first memory, one line corresponding to one reception channel, said lines being read R times at a rate $H_1$, placed on a carrier frequency $F_1$ and forming the signal $V_1(t)$ with the signals transmitted in the corresponding direction which come from a second memory having second lines being read R times at an increasing rate $H_2$, and placed on increasing carrier frequency $F_2$ during the R readings of said second memory in order to form a signal $V_2(t)$ and further including convolution means for receiving said $V_1(t)$ and $V_2(t)$ signals and outputting, convolution signals $C(t)$ and a demultiplexing means for receiving said convoluted signals $C(t)$ and applying an output to said display unit.

* * * * *